(12) United States Patent
Hung et al.

(10) Patent No.: US 10,236,512 B2
(45) Date of Patent: Mar. 19, 2019

(54) PREPARATION METHOD OF BATTERY COMPOSITE MATERIAL AND PRECURSOR THEREOF

(71) Applicant: Advanced Lithium Electrochemistry Co., Ltd., Taoyuan, Taoyuan County (TW)

(72) Inventors: Chen-Tsung Hung, Taoyuan (TW); Chi-Yen Lin, Taoyuan (TW); An-Feng Huang, Taoyuan (TW)

(73) Assignee: ADVANCED LITHIUM ELECTROCHEMISTRY CO., LTD., Taoyuan (TW)

( * ) Notice: Subject to any disclaimer, the term of this patent is extended or adjusted under 35 U.S.C. 154(b) by 225 days.

(21) Appl. No.: 14/889,418

(22) PCT Filed: May 8, 2014

(86) PCT No.: PCT/CN2014/077080
§ 371 (c)(1),
(2) Date: Nov. 5, 2015

(87) PCT Pub. No.: WO2014/180333
PCT Pub. Date: Nov. 13, 2014

(65) Prior Publication Data
US 2016/0072129 A1    Mar. 10, 2016

Related U.S. Application Data

(60) Provisional application No. 61/820,939, filed on May 8, 2013.

(51) Int. Cl.
*H01M 4/58* (2010.01)
*C01B 25/45* (2006.01)
(Continued)

(52) U.S. Cl.
CPC .......... *H01M 4/5825* (2013.01); *C01B 25/45* (2013.01); *H01M 4/049* (2013.01); *H01M 4/364* (2013.01);
(Continued)

(58) Field of Classification Search
CPC .... H01M 4/5825; H01M 4/049; H01M 4/364; C01B 25/45; C01P 2002/72;
(Continued)

(56) References Cited

U.S. PATENT DOCUMENTS

2004/0262571 A1    12/2004   Barker et al.
2010/0202951 A1*    8/2010   Wu .................... C01B 25/37
                                                          423/305
(Continued)

FOREIGN PATENT DOCUMENTS

CA        2502592 A1     4/2004
CN     101142138 A       3/2008
(Continued)

OTHER PUBLICATIONS

Shyue Ping Ong et al., Thermal stabilities of delithiated olivine MPO4 (M=Fe, Mn) cathodes investigated using first principles calculations, Electrochemistry Communications 12 (2010) pp. 427-430, Elsevier B.V., USA.

*Primary Examiner* — Mark Kopec
*Assistant Examiner* — Danny N Kang
(74) *Attorney, Agent, or Firm* — Kirton McConkie; Evan R. Witt (57) ABSTRACT

A preparation method of a battery composite material at least includes the following steps. Firstly, an iron compound, phosphoric acid, a manganese compound, a lithium compound and a carbon source are provided. Then, the phosphoric acid is added to a mixture of the iron compound and deionized water while stirring to form a first phosphate (Continued)

solution, a first amount of the manganese compound is added to the first phosphate solution, and the manganese compound and the first phosphate solution are continuously reacted for a first time period, so that a first product solution is formed. Then, a reaction between the first product solution, the carbon source and the lithium compound is carried out to form a precursor. Then, the precursor is thermally treated to form the battery composite material, wherein the battery composite material has a chemical formula: $LiFe_xMn_{1-x}PO_4$. Since the product powder is not subjected to aggregation during the thermal treatment process, the electric performance of the battery is enhanced.

13 Claims, 8 Drawing Sheets

(51) Int. Cl.
*H01M 4/04* (2006.01)
*H01M 4/36* (2006.01)
(52) U.S. Cl.
CPC ...... *C01P 2002/72* (2013.01); *C01P 2004/03* (2013.01); *C01P 2004/04* (2013.01); *C01P 2004/64* (2013.01); *C01P 2006/40* (2013.01)
(58) Field of Classification Search
CPC .............. C01P 2004/03; C01P 2004/04; C01P 2004/64; C01P 2006/40
USPC ........................................................ 252/500
See application file for complete search history.

(56) References Cited

U.S. PATENT DOCUMENTS

| | | | | |
|---|---|---|---|---|
| 2010/0248025 | A1* | 9/2010 | Kimura | ............... H01M 10/052 |
| | | | | 429/207 |
| 2010/0279117 | A1* | 11/2010 | Gu | ........................ C01B 25/37 |
| | | | | 428/402 |
| 2012/0135309 | A1* | 5/2012 | Kim | ...................... H01M 4/136 |
| | | | | 429/220 |
| 2014/0127111 | A1* | 5/2014 | Tahara | ................ H01M 4/5825 |
| | | | | 423/306 |

FOREIGN PATENT DOCUMENTS

| | | |
|---|---|---|
| CN | 101327922 | 12/2008 |
| CN | 102468479 | 5/2012 |
| CN | 102695760 A | 9/2012 |
| CN | 102791625 | 11/2012 |
| CN | 102803133 | 11/2012 |
| CN | 103066258 | 4/2013 |
| EP | 2546194 A1 | 1/2013 |
| JP | 2009218205 A | 9/2009 |
| JP | 2011-213587 | 10/2011 |
| JP | 2012190568 A | 10/2012 |
| JP | 2013-049583 | 3/2013 |
| KR | 10-2012-0120352 | 11/2012 |
| KR | 10-2012-0123468 | 11/2012 |
| WO | 2011092275 A1 | 8/2011 |
| WO | 2011092281 A1 | 8/2011 |
| WO | 2014098937 A1 | 6/2014 |

* cited by examiner

PREPARATION METHOD OF BATTERY COMPOSITE MATERIAL AND PRECURSOR THEREOF

FIELD OF THE INVENTION

The present invention relates to a preparation method, and more particularly to a preparation method of a battery composite material.

BACKGROUND OF THE INVENTION

With rapid development of science and technology, a large number of electronic products are introduced into the market. For increasing use convenience, the general trends in designing electronic products are toward small size, light weightiness and easy portability. For example, these electronic devices include portable consumer electronic devices, portable measuring instruments, portable medical instruments, electric bicycles or electric hand tools. Generally, these electronic devices use portable power sources as sources of electric power. Among various portable power sources, batteries are widely used because of safety, lightweight and convenient features.

Moreover, with the promotion of sustainable development and environmental protection concepts, electric vehicle technologies have received considerable attention because electric vehicles can solve the problems of air pollution and oil shortage. Since the electric vehicles use rechargeable batteries as the power sources, it is an important issue to increase the electric properties and the cycle lives of the batteries.

Moreover, among the conventional batteries, the lithium-ion batteries are more potential for development because lithium-ion batteries have high volumetric capacitance, rechargeable features, good charge/discharge cycle characteristics and other appropriate properties. Moreover, the lithium iron phosphate-based compound ($LiFePO_4$, also abbreviated to LFP) is more popular. The battery with the lithium iron phosphate-based compound as the cathode material has many benefits such as a larger current, a longer recycle life, an anti-oxidation property and an anti-acidic effect. Moreover, since the lithium iron phosphate-based compound does not release oxygen gas during the charge/discharge process, the battery has no explosion risk. Consequently, the lithium iron phosphate-based compound is considered to be the potential cathode material of the lithium-ion battery.

However, the conventional method of preparing the lithium iron phosphate compound has some drawbacks. For example, during the thermal treatment process, the particles of the lithium iron phosphate compound are readily suffered from aggregation. Under this circumstance, the particle size of the lithium iron phosphate powder is increased and the electric properties of the battery are deteriorated.

Therefore, there is a need of providing an improved preparation method of a battery cathode material with enhanced electric properties in order to overcome the above drawbacks.

SUMMARY OF THE INVENTION

An object of the present invention provides a preparation method of a battery composite material. By diffusing a manganese source into an iron source, the product powder is not subjected to aggregation during the thermal treatment process. Consequently, the drawbacks of causing the deteriorated electric property of the lithium iron phosphate compound because of the increased particle size will be overcome.

Another object of the present invention provides a preparation method of a battery composite material. By diffusing a manganese source into an iron source, the manganese source surrounds and covers the iron source to facilitate the reaction. Moreover, since the product powder is not subjected to aggregation during the thermal treatment process, the electric property of the battery is enhanced.

Another object of the present invention provides a preparation method of a battery composite material. By selecting the particle size of the iron source and the ratio of iron to manganese, the battery composite material with ideal electric properties can be prepared according to the practical requirements.

In accordance with an aspect of the present invention, there is provided a preparation method of a battery composite material. The preparation method at least includes the following steps. In a step (a), an iron compound, phosphoric acid ($H_3PO_4$), a manganese compound, a lithium compound and a carbon source are provided. In a step (b), the phosphoric acid is added to a mixture of the iron compound and deionized water while stirring to form a first phosphate solution, a first amount of the manganese compound is added to the first phosphate solution, and the manganese compound and the first phosphate solution are continuously reacted for a first time period, so that a first product solution is formed. In a step (c), a reaction between the first product solution, the carbon source and the lithium compound is carried out to form a precursor, wherein the carbon source is carbohydrate, an organic compound, a polymeric material or a macromolecule material. In a step (d), the precursor is thermally treated to form the battery composite material, wherein the battery composite material has a chemical formula: $LiFe_xMn_{1-x}PO_4$, where x is larger than 0.

In accordance with another aspect of the present invention, there is provided a preparation method of a battery composite material. The preparation method at least includes the following steps. In a step (a), an iron compound, phosphoric acid ($H_3PO_4$), $MnCO_3$, LiOH and a carbon source are provided. In a step (b), the phosphoric acid is added to a mixture of the iron compound and deionized water while stirring to form a first phosphate solution, a first amount of $MnCO_3$ is added to the first phosphate solution, and $MnCO_3$ and the first phosphate solution are continuously reacted for a first time period, so that a first product solution is formed. In a step (c), a reaction between the first product solution, the carbon source and LiOH is carried out to form a precursor, wherein the carbon source is carbohydrate, an organic compound, a polymeric material or a macromolecule material. In a step (d), the precursor is thermally treated to form the battery composite material, wherein the battery composite material has a chemical formula: $LiFe_xMn_{1-x}PO_4$, where x is in the range between 0.1 and 0.9.

In accordance with another aspect of the present invention, there is provided a preparation method of a precursor of a battery composite material. The preparation method at least includes the following steps. Firstly, a reaction between an iron compound and a compound that releases manganese ions in an aqueous solution of phosphoric acid is carried out, so that a first product solution is formed. Then, a reaction between the first product solution and a compound that releases lithium ions in the aqueous solution of phosphoric acid is carried out, so that a precursor solution is formed. Then, the precursor solution is dried to form the precursor of the battery composite material, wherein the precursor of the battery composite material has a chemical formula: $LiFe_xMn_{1-x}PO_4$, where x is larger than 0.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
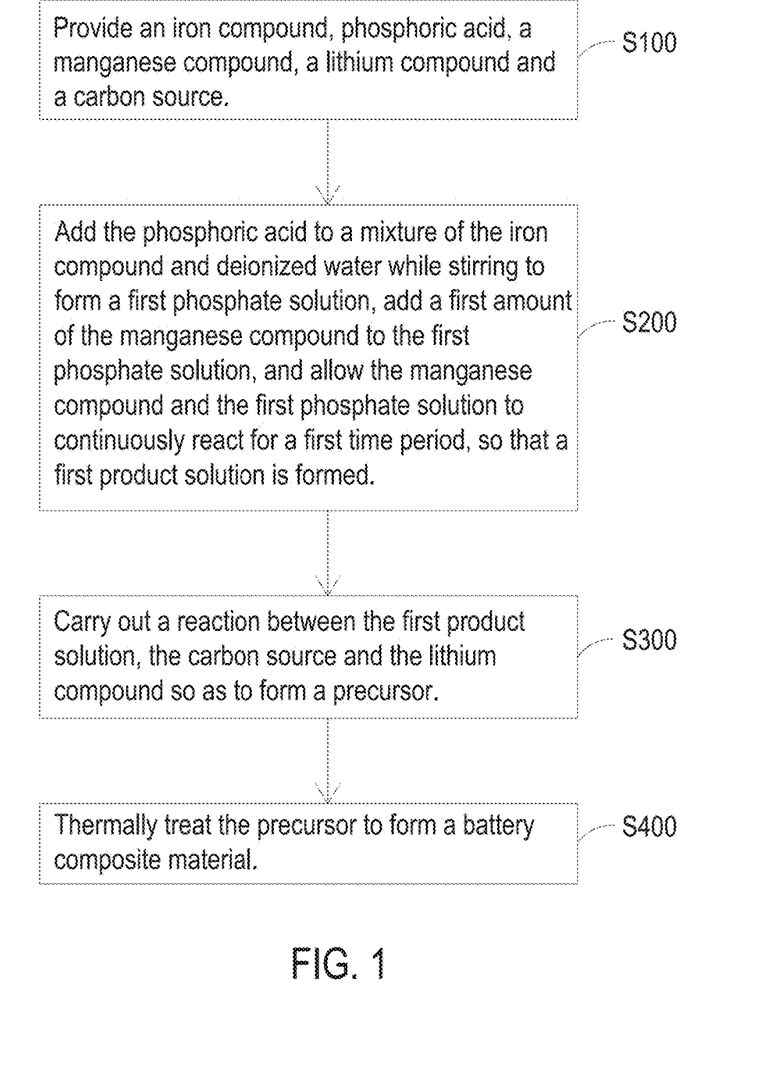
FIG. 1 is a flowchart illustrating a preparation method of a battery composite material according to an embodiment of the present invention.

FIG. 1 is a flowchart illustrating a preparation method of a battery composite material according to an embodiment of the present invention. The preparation method of the battery composite material comprises the following steps. Firstly, in a step S100, an iron compound, phosphoric acid ($H_3PO_4$), a manganese compound and a lithium compound are provided. An example of the manganese compound includes but is not limited to manganese carbonate ($MnCO_3$), manganese oxide (MnO), a manganese-containing compound or any other compound that releases manganese ions in an aqueous solution of the phosphoric acid. Manganese carbonate is preferred. An example of the lithium compound includes but is not limited to lithium hydroxide (LiOH), lithium carbonate ($Li_2CO_3$), a lithium-containing compound or any other compound that releases lithium ions in an aqueous solution of phosphoric acid. Lithium hydroxide is preferred.

An example of the iron compound includes but is not limited to $Fe_7(PO_4)_6$, $FePO_4 \cdot 2H_2O$, $LiFePO_4$, $Fe_2O_3$, $FeC_2O_4 \cdot 2H_2O$, $FeC_6H_5O_7$, any other iron-containing compound or a combination thereof. Among these iron sources, $Fe_7(PO_4)_6$, $FePO_4 \cdot 2H_2O$ and $LiFePO_4$ are preferred.

In a step S200, the iron compound and deionized water are mixed and stirred, so that the iron compound is initially dispersed in the deionized water. Then, phosphoric acid (85 wt %) is added while stirring, so that the iron compound is uniformly dispersed to form a first phosphate solution. Then, a first amount of the manganese compound is added to the first phosphate solution. The manganese compound and the first phosphate solution are continuously reacted for a first time period, so that a first product solution is formed. In other words, the iron compound is used as an iron source, and the phosphoric acid is used to increase the dispersion of the iron compound in the deionized water so as to facilitate the subsequent reaction. In this embodiment, the first product solution is a solution containing the iron compound, manganese ions and phosphate ions.

In this embodiment, the phosphate ions in the first phosphate solution can increase dissociation of the manganese compound, and thus the manganese ions in the first product solution can be uniformly dispersed. In an embodiment, the manganese compound and the first phosphate solution are continuously reacted for at least 24 hours (i.e., the first time period), preferably 24 hours but not limited thereto. Moreover, the first time period can be adjusted according to the concentration of the phosphate ions.

Then, in a step S300, the reaction between the first product solution, the carbon source and the lithium compound is carried out to form a precursor. An example of the carbon source includes but is not limited to carbohydrate, an organic compound, a polymeric material or a macromolecule material. For example, the carbohydrate is fructose or lactose.

In a step S400, the precursor is thermally treated to form a battery composite material. The battery composite material produced by the preparation method of the present invention has a chemical formula: $LiFe_xMn_{1-x}PO_4$, where x is larger than 0 and represents a ratio of iron to manganese. In the chemical formula, x is in the range between 0.1 and 0.9, and preferably 0.27.

In an embodiment, the step S300 further comprises a step of carrying out a reaction between a transition metal oxide, the first product solution, the carbon source and the lithium compound. Consequently, in the step S400, the battery composite material $LiFe_xMn_{1-x}PO_4$ containing metal oxide or a nano-metal oxide cocrytallized lithium iron manganese phosphate (LFMP-NCO) with a chemical formula $LiFe_xMn_{1-x}PO_4 \cdot zM$ is produced, wherein z is larger than or equal to 1, and M is the transition metal oxide. An example of the transition metal oxide includes but is not limited to vanadium pentoxide ($V_2O_5$).

Figure 2:
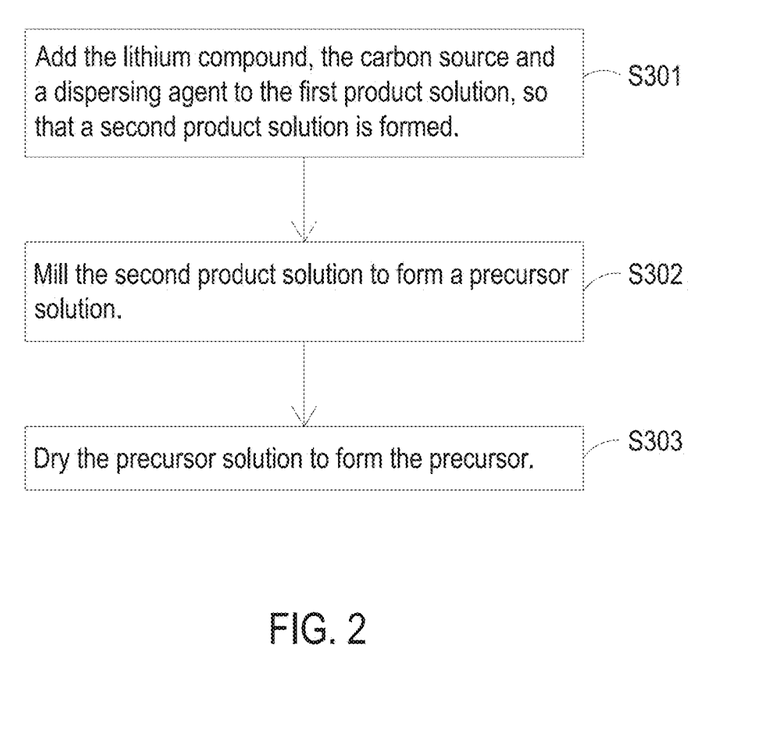
FIG. 2 is a flowchart illustrating the detailed procedures of the step S300 of the preparation method as shown in FIG. 1.

FIG. 2 is a flowchart illustrating the detailed procedures of the step S300 of the preparation method as shown in FIG. 1. After the reaction between the iron source and the manganese source is completely carried out for 24 hours, the lithium compound, the carbon source and a dispersing agent are added to the first product solution, so that a second product solution is formed (Step S301). For example, the dispersing agent is a non-ionic surfactant such as Triton X-100. Then, in a step S302, the second product solution is milled to form a precursor solution. In this embodiment, the milling process is carried out for 1 hour by using a ball mill at a milling speed of 450 rpm~600 rpm, but not limited thereto.

Please refer to FIG. 2 again. In the step S303, the precursor solution is dried to remove excess water, so that an initially dried precursor is formed. Then, the initially dried precursor is placed in a ceramic crucible and exposed to a protective atmosphere (e.g., nitrogen or argon gas). Under the protective atmosphere, the precursor is heated to a first temperature (e.g., 800° C.), and continuously sintered for a second time period (e.g., at least 7 hours but not limited thereto). Consequently, the precursor is thermally treated. After the precursor is sintered, the product powder of the battery composite material of the present invention is produced. The battery composite material is lithium iron manganese phosphate having the chemical formula $LiFe_xMn_{1-x}PO_4$. In this thermal treatment process, the manganese source contained in the precursor will diffuse into the iron source. Consequently, the manganese source surrounds and covers the iron source in partial substitution. Since the product powder is not subjected to aggregation during the thermal treatment process, the electric performance of the battery is enhanced. Moreover, the particle size of the product powder formed by the preparation method of the present invention is similar to the particle size of the iron compound raw material. In other words, since the electric properties of the battery are enhanced, the product stability is increased.

Moreover, in the step S400, the ratio of iron to manganese in the battery composite material is determined by adjusting the fractions of the iron compound, the phosphoric acid, the manganese compound and the lithium compound. In other words, the battery composite material with ideal electric properties can be produced according to the practical requirements.

The preparation process of the battery composite material will be illustrated in the following examples.

Example 1

Firstly, 103 grams of $Fe_7(PO_4)_6$ and 2 liters of deionized water were mixed and thoroughly stirred. Then, 264.4 grams of phosphoric acid ($H_3PO_4$, 85 wt %) was added to the mixture. Alternatively, the concentration of the phosphoric acid may be higher than 85 wt %. After the mixture was uniformly stirred, manganese carbonate ($MnCO_3$) was added to the mixture and reacted with the mixture to form a first product solution. After the first product solution was continuously stirred for 24 hours and sufficiently reacted, 132.1 grams of lithium hydroxide (LiOH), 54 grams of fructose and 0.06 gram of Triton X-100 were added to the first product solution. Consequently, a second product solution was formed. Alternatively, the fructose may be replaced by the mixture of 12 wt % of lactose and 88 wt % of fructose. Then, the second product solution is continuously milled for 1 hour with a ball mill (milling speed: 450 rpm~650 rpm). Consequently, a precursor solution of lithium iron manganese phosphate ($LiFe_xMn_{1-x}PO_4$) was formed. Then, the precursor solution was dried to form an initially dried precursor. Then, the initially dried precursor was placed in a ceramic crucible and exposed to a protective atmosphere. Under the protective atmosphere, the precursor was sintered at a temperature higher than 800° C. for at least 7 hours. Consequently, a product powder was formed.

Example 2

In this example, $Fe_7(PO_4)_6$ used in Example 1 was replaced with $LiFePO_4$, and the fractions of the reactants were correspondingly adjusted. Firstly, 118.32 grams of $LiFePO_4$ and 2 liters of deionized water were mixed and thoroughly stirred. Then, 264.4 grams of phosphoric acid ($H_3PO_4$, 85 wt %) was added to the mixture. Alternatively, the concentration of the phosphoric acid may be higher than 85 wt %. After the mixture was uniformly stirred, manganese carbonate ($MnCO_3$) was added to the mixture and reacted with the mixture to form a first product solution. After the first product solution was continuously stirred for 24 hours and sufficiently reacted, 132.1 grams of lithium hydroxide (LiOH), 54 grams of fructose and 0.06 gram of Triton X-100 were added to the first product solution. Consequently, a second product solution was formed. Alternatively, the fructose may be replaced by the mixture of 12 wt % of lactose and 88 wt % of fructose. Then, the second product solution is continuously milled for 1 hour with a ball mill (milling speed: 450 rpm~650 rpm). Consequently, a precursor solution of lithium iron manganese phosphate ($LiFe_xMn_{1-x}PO_4$) was formed. Then, the precursor solution was dried to form an initially dried precursor. Then, the initially dried precursor was placed in a ceramic crucible and exposed to a protective atmosphere. Under the protective atmosphere, the precursor was sintered at a temperature higher than 800° C. for at least 7 hours. Consequently, a product powder was formed.

Figure 3:
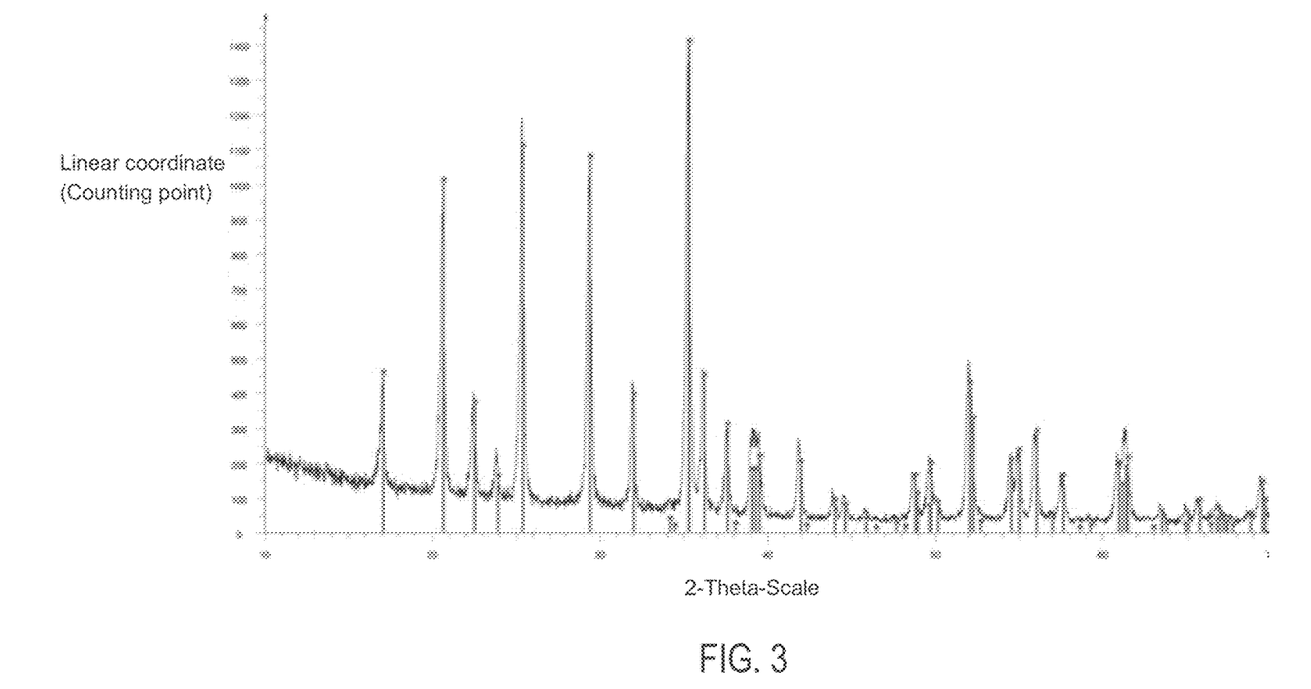
FIG. 3 schematically illustrates the X-ray diffraction pattern of the product powder prepared in Example 1.
Figure 4:
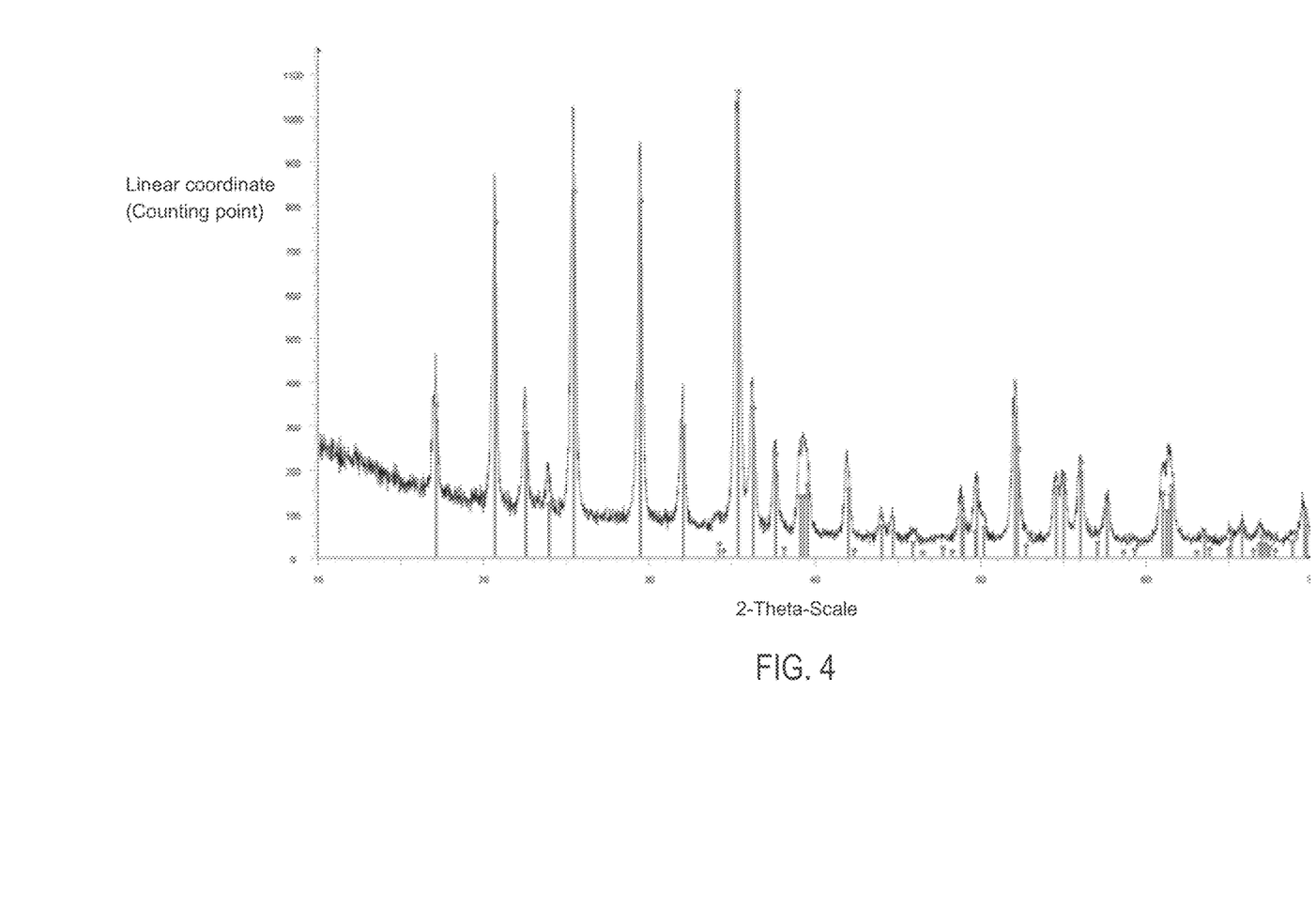
FIG. 4 schematically illustrates the X-ray diffraction pattern of the product powder prepared in Example 2.
Figure 5:
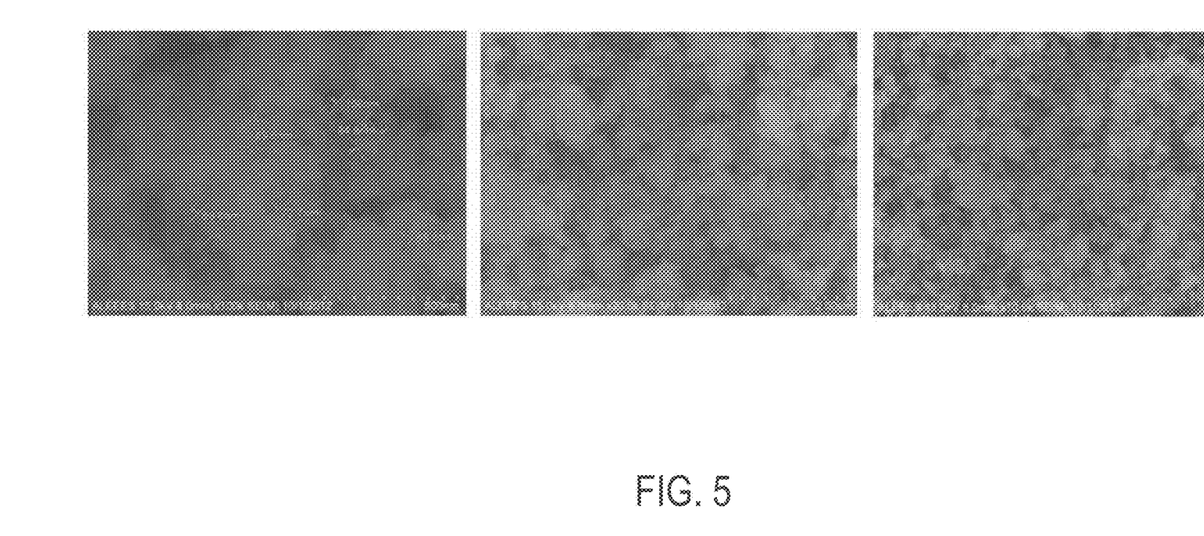
FIG. 5 schematically illustrates the SEM photograph of the product powder prepared in Example 1.
Figure 6:
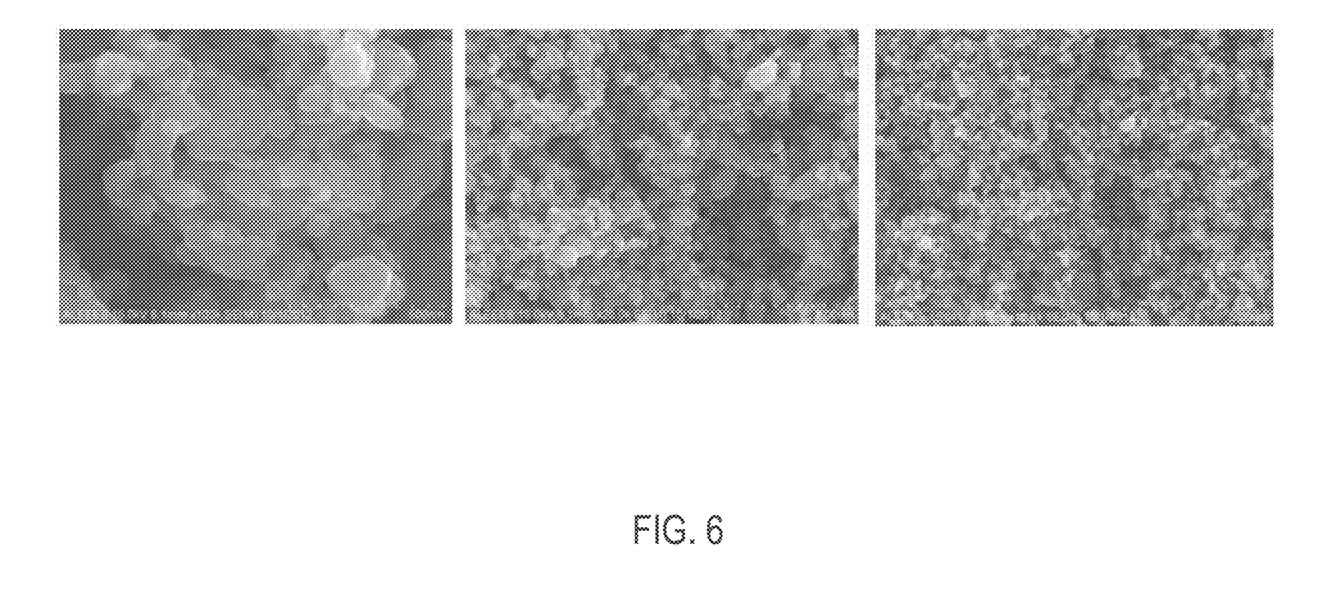
FIG. 6 schematically illustrates the SEM photograph of the product powder prepared in Example 2.

The product powders prepared in Example 1 and Example 2 were analyzed by an X-ray diffractometer (XRD) and compared with the data of ICDD (International Center for Diffraction Data). The XRD results are shown in FIGS. 3 and 4. Moreover, the surface topographies of the product powders prepared in Example 1 and Example 2 are shown in FIGS. 5 and 6. Please refer to the XRD results of FIGS. 3 and 4. After the data of the product powders that were prepared in Example 1 and Example 2 and measured by the X-ray diffractometer were compared with the data of $LiFe_{0.3}Mn_{0.7}PO_4$ from ICDD, the Raman shifts indicated that both of the chemical formulae were $LiFe_{0.27}Mn_{0.73}PO_4$.

As shown in FIG. 5, the average particle size of the product powder prepared in Example 1 is smaller than 100 nanometers, and the average particle size of the reactant $Fe_7(PO_4)_6$ is also smaller than 100 nanometers. As shown in FIG. 6, the particle size of the product powder prepared in Example 2 is in the range between 100 nanometers and 300 nanometers, and the particle size of the reactant $LiFePO_4$ is also in the range between 100 nanometers and 300 nanometers. In other words, the particle size of the iron source is substantially equal to the particle size of the product powder. The particle size of the product powder is not increased because the aggregation problem is effectively avoided. Consequently, the electric performance of the battery is enhanced.

Figure 7:
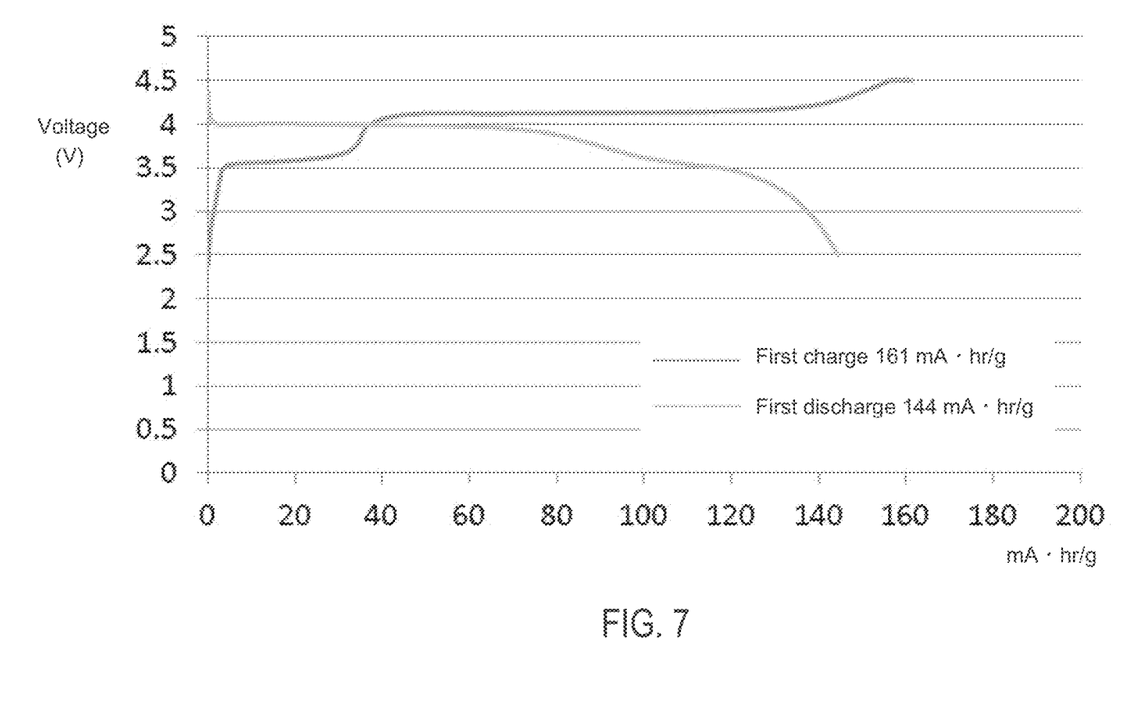
FIG. 7 schematically illustrates the charge/discharge curve of a coin-type cell produced from the product powder of Example 1.
Figure 8:
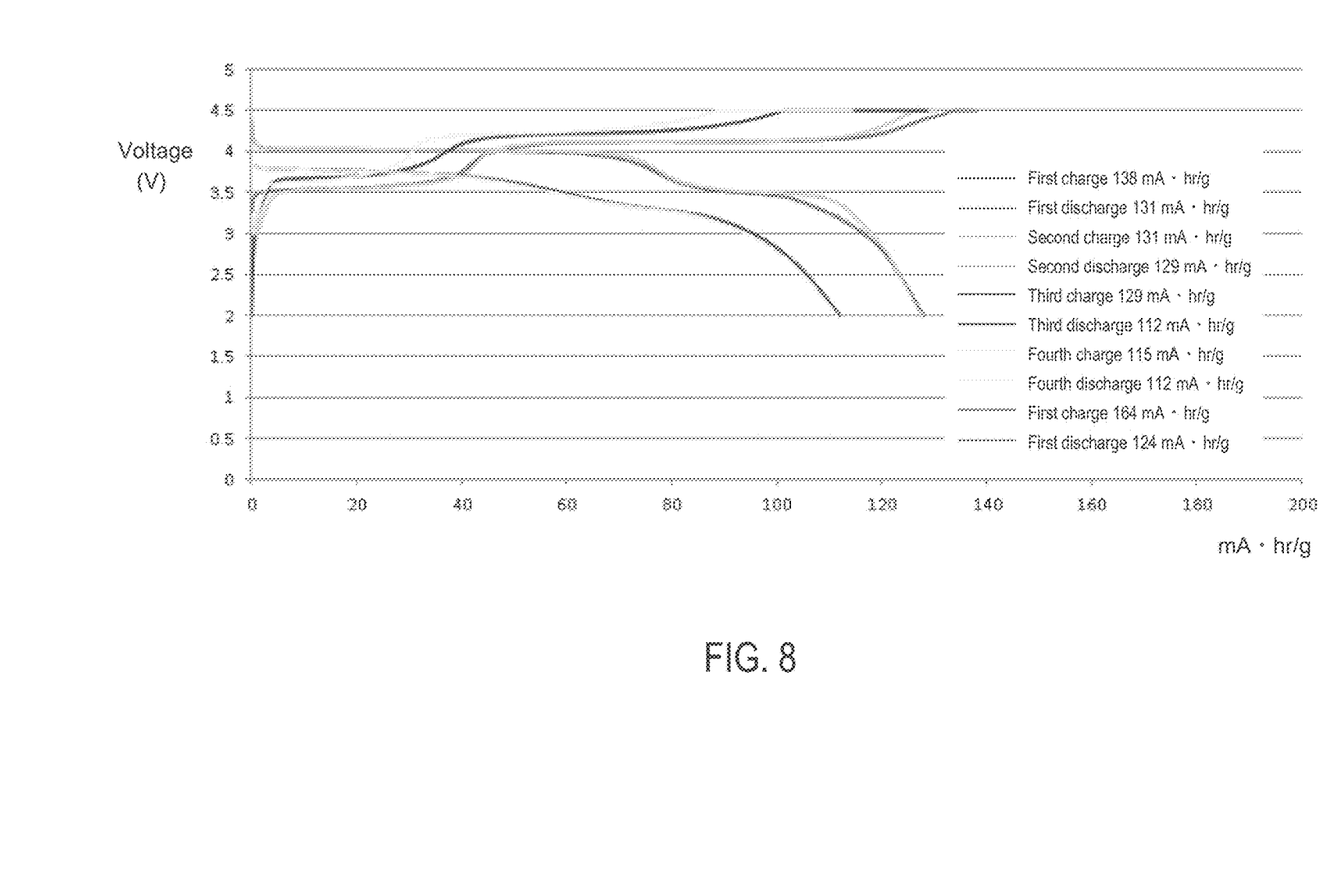
FIG. 8 schematically illustrates the charge/discharge curve of a coin-type cell produced from the product powder of Example 2.

The product powders prepared in Example 1 and Example 2 were coated on aluminum substrates in order to assemble coin-type cells. Then, a charge/discharge tester was used to test the electric properties of the coin-type cells at 0.1 C for 2 charge/discharge cycles and at 2 C for 2 charge/discharge cycles. The test results are shown in FIGS. 7 and 8. When the product powders prepared in Example 1 and Example 2 were used as the battery cathode materials, the charge/discharge behaviors were more stable and the battery capacities were higher. Consequently, the preparation method of the battery composite material according to the present invention can increase the electric properties of the battery.

From the above descriptions, the present invention provides a preparation method of a battery composite material. By diffusing the manganese source into the iron source, the product powder is not subjected to aggregation during the thermal treatment process. Consequently, the electric property and the stability of the battery are enhanced. Moreover, by selecting the particle size of the iron source and the ratio of iron to manganese, the battery composite material with ideal electric properties can be prepared according to the practical requirements.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A preparation method of a battery composite material, at least comprising steps, in sequence, of:
   (a) providing an iron compound, phosphoric acid ($H_3PO_4$), a manganese compound, a lithium compound and a carbon source, wherein the iron compound is $Fe_7(PO_4)_6$;
   (b) adding the phosphoric acid to a mixture of the iron compound and deionized water while stirring to form a first phosphate solution, adding a first amount of the manganese compound to the first phosphate solution, and allowing the manganese compound and the first phosphate solution to continuously react for a first time period, so that a first product solution is formed;
   (c) carrying out a reaction between the first product solution, the carbon source and the lithium compound to form a precursor, wherein the carbon source is carbohydrate, an organic compound, a polymeric material or a macromolecule material; and
   (d) thermally treating the precursor to form the battery composite material, wherein the battery composite material has a chemical formula: $LiFe_xMn_{1-x}PO_4$, where x is larger than 0.

2. The preparation method of the battery composite material according to claim 1, wherein the step (c) further comprises a step of carrying out a reaction between a transition metal oxide, the first product solution, the carbon source and the lithium compound, and the battery composite material formed in the step (d) is a nano-metal oxide cocrystallized lithium iron manganese phosphate.

3. The preparation method of the battery composite material according to claim 1, wherein in the chemical formula of the battery composite material, x is in the range between 0.1 and 0.9, and x is determined according to the first amount of the manganese compound.

4. The preparation method of the battery composite material according to claim 3, wherein in the chemical formula of the battery composite material, x is 0.27.

5. The preparation method of the battery composite material according to claim 1, wherein the first time period is at least 24 hours.

6. The preparation method of the battery composite material according to claim 1, wherein the step (c) comprises steps of:
   (c1) adding the lithium compound, the carbon source and a dispersing agent to the first product solution, thereby forming a second product solution;
   (c2) milling the second product solution to form a precursor solution; and
   (c3) drying the precursor solution to form the precursor.

7. The preparation method of the battery composite material according to claim 6, wherein the milling step is implemented with a ball mill.

8. The preparation method of the battery composite material according to claim 1, wherein the step (d) further comprises steps of placing the precursor in a ceramic crucible, and heating the precursor to a first temperature and continuously sintering the precursor for a second time period under a protective atmosphere, so that a product powder of the battery composite material is produced.

9. The preparation method of the battery composite material according to claim 8, wherein the first temperature is at least 800° C., and the second time period is at least 7 hours.

10. The preparation method of the battery composite material according to claim 1, wherein the step (b) further comprises steps of preparing a mixture of 103 grams of $Fe_7(PO_4)_6$ and two liters of the deionized water, adding 264.4 grams of the phosphoric acid to the mixture and stirring the mixture, so that the first phosphate solution is formed, wherein after the first amount of $MnCO_3$ is added to the first phosphate solution, a reaction between $MnCO_3$ and the first phosphate solution is continuously carried out for the first time period, so that the first product solution is formed.

11. The preparation method of the battery composite material according to claim 1, wherein the step (b) further comprises steps of preparing a mixture of 118.32 grams of $LiFePO_4$ and two liters of the deionized water, adding 264.4 grams of the phosphoric acid to the mixture and stirring the mixture, so that the first phosphate solution is formed, wherein after the first amount of $MnCO_3$ is added to the first phosphate solution, a reaction between $MnCO_3$ and the first phosphate solution is continuously carried out for the first time period, so that the first product solution is formed.

12. A preparation method of a battery composite material, at least comprising steps, in sequence, of:
   (a) providing an iron compound, phosphoric acid ($H_3PO_4$), $MnCO_3$, LiOH and a carbon source, wherein the iron compound is $Fe_7(PO_4)_6$;
   (b) adding the phosphoric acid to a mixture of the iron compound and deionized water while stirring to form a first phosphate solution, adding a first amount of $MnCO_3$ to the first phosphate solution, and allowing $MnCO_3$ and the first phosphate solution to continuously react for a first time period, so that a first product solution is formed;
   (c) carrying out a reaction between the first product solution, the carbon source and LiOH to form a precursor, wherein the carbon source is carbohydrate, an organic compound, a polymeric material or a macromolecule material; and
   (d) thermally treating the precursor to form the battery composite material, wherein the battery composite material has a chemical formula: $LiFe_xMn_{1-x}PO_4$, where x is in the range between 0.1 and 0.9.

13. A preparation method of a precursor of a battery composite material, at least comprising steps, in sequence, of:
   carrying out a reaction between an iron compound and a compound that releases manganese ions in an aqueous solution of phosphoric acid, thereby forming a first product solution, wherein the iron compound is $Fe_7(PO_4)_6$;
   carrying out a reaction between the first product solution and a compound that releases lithium ions in the aqueous solution of phosphoric acid, thereby forming a precursor solution; and
   drying the precursor solution to form the precursor of the battery composite material, wherein the precursor of the battery composite material has a chemical formula: $LiFe_xMn_{1-x}PO_4$, where x is larger than 0.

* * * * *